UNITED STATES PATENT OFFICE.

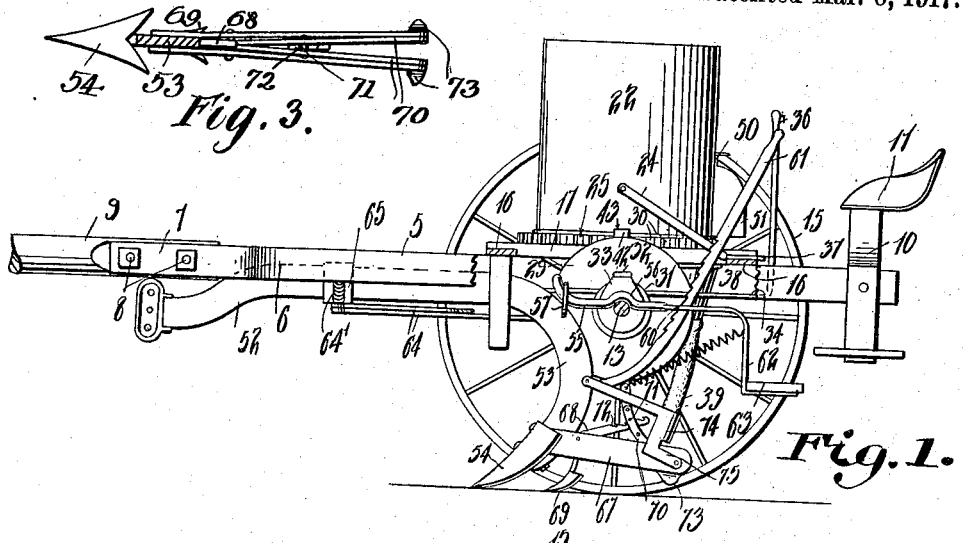
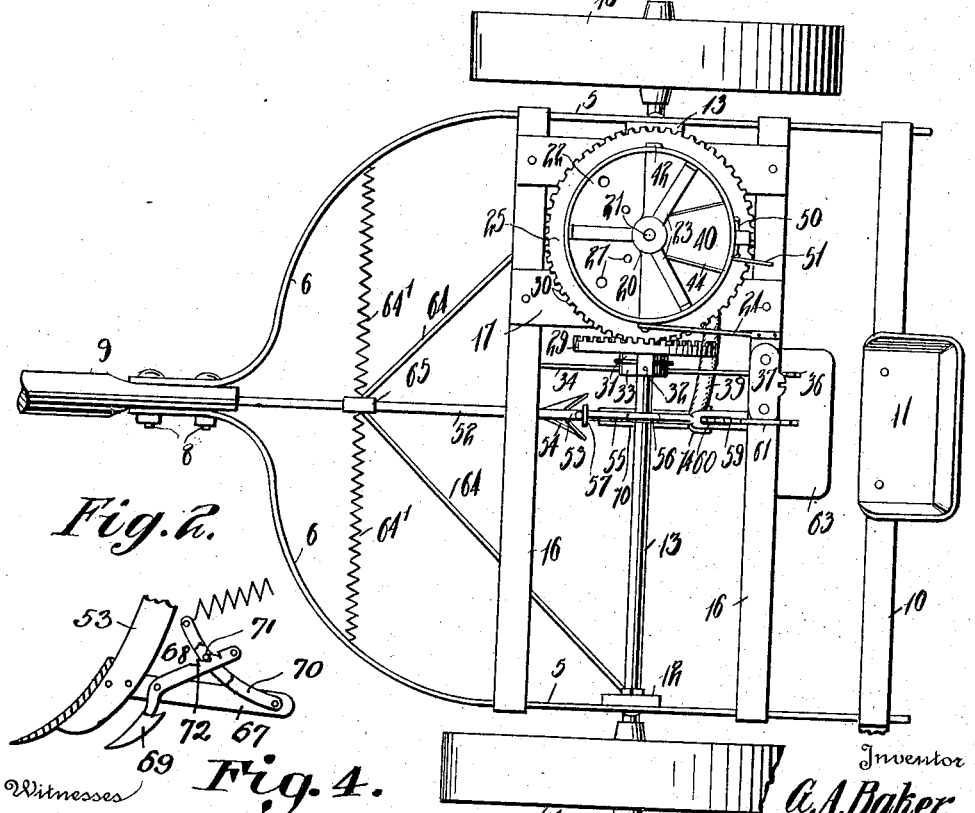

GUSTAVUS A. BAKER, OF MEMPHIS, TEXAS.

PLANTER.

1,218,159.

Specification of Letters Patent. Patented Mar. 6, 1917.

Application filed December 1, 1913. Serial No. 803,978.

*To all whom it may concern:*

Be it known that I, GUSTAVUS A. BAKER, a citizen of the United States, residing at Memphis, in the county of Hall, State of Texas, have invented certain new and useful Improvements in Planters; and I do hereby declare the following to be a full, clear, and exact description of the invention, such as will enable others skilled in the art to which it appertains to make and use the same.

This invention relates to new and useful improvements in combined plows and planters.

An object of the invention resides in the provision of a device in which seeds will be dropped, a furrow formed and the seeds subsequently covered.

A further object of the invention resides in the provision of means whereby the subsoil may be plowed which means is adjustable.

With these and other objects in view, such as will appear as my description progresses, my invention comprises the combination and arrangement of parts as set forth in and falling within the scope of the appended claims.

In the drawings:—

Figure 1 is a side elevation of the improved machine with one of the wheels removed to more clearly show the structure.

Fig. 2 is a top plan view thereof.

Fig. 3 is a fragmental vertical sectional view showing the plow and sub-soil plow.

Fig. 4 is a plan view of the parts shown in Fig. 3.

Referring to the drawings wherein like parts are indicated by like characters throughout the several views:—

My device includes a frame which is provided with side bars 5 having their forward ends directed inwardly at 6 and terminating in forward extensions 7 which are secured by bolts 8 to a draft tongue 9. Bolted to and connecting the rear ends of the side bars is an arcuate bar 10 to which is secured a seat 11. Journaled in the hangers 12 which depend from the side bars of the frame is an axle 13 on which wheels 14 and 15 are mounted. Extending between the side bars are beams 16 which are connected by cross ties 17.

A plow beam 52 having its forward end disposed adjacent and under the rear end of the draft tongue 9 is provided which beam carries a clevis and which terminates at its rear end in a downwardly and forwardly extending portion 53 on which portion a plow 54 is mounted. A bar 55 is provided which has a bowed portion 56 seated on the central portion of the shaft 13. This bar is connected by a link 57 to the rear portion of the plow beam. The rear end of the bar 55 is provided with a slot 59 across the forward end of which a pin 60 extends. A bar 61 is pivoted to the downward extension 53 of the plow beam and is provided with a plurality of ratchet teeth for engaging the pin 60 to hold the plow in adjusted positions with relation to the bar 55. Depending from the rear end of the bar is a pair of members 62 to which is secured a tread portion 63.

In order that the plow beam may be held against lateral movement a pair of bars 64 are provided which are pivoted to a sleeve 65 on the forward end of the plow beam and extend in diverging relation rearwardly. These bars are secured at their rear ends to the hangers 12. Springs 64′ extend from the sleeve 65 to the side members 5 and serve to hold the plow beam in a substantially horizontal position. Extending rearwardly from the lower end of the extension 53 of the plow beam is a pair of members 67. Pivoted between the forward end of these members 67 is a bar 68 carrying a sub-soil plow 69 at its lower end. A pair of members 70 are pivoted to the ends of the members 67, as at 70′, and extend forwardly in converging relation to embrace the sides of the bar 68. These members are secured at their forward ends by pins 71 and the bar 68 is provided with a plurality of ratchet teeth 72 for engagement with one of the pins whereby the members 70 and the bar 68 carrying the sub-soil plow will hold each other in predetermined relation and in a predetermined position with relation to the main plow. A coil spring 68′ is secured to the forward ends of the members 70 and to the members 62 to resiliently hold the ratchet teeth on the bar 68 in engagement with the pin 71. The members 70 are provided at their lower ends with extensions 73 which are adapted to engage the earth to cover the seeds after they have been planted. Secured to the portion 53 of the plow beam and the members 67 are arms 75 which have a cuff 74 formed thereon for the reception of a seed tube 39 which extends upwardly and is connected to a suitable hopper 22 mounted on the cross ties 17.

It will be observed that when the operator steps on the tread 63 the same will be lowered and the plow raised which will relieve the tension on the springs 68' and thus permit the relative adjustment of the sub-soil plow and the members 70.

While I have illustrated and described a particular embodiment of my invention it has merely been for the sake of convenience and I do not wish to be limited to that particular embodiment as it is obvious that numerous changes may be made in the details of construction without departing from the spirit of the invention or exceeding the scope of the claims.

What is claimed is:

1. In a combined plow and planter, rearwardly extending spaced members secured rigidly adjacent the lower end of the plow beam, an angular bar pivoted between the two members adjacent the plow beam and having a sub-soil plow on the lower end thereof and an upwardly extending arm having a plurality of notches in the end thereof, arcuate members pivotally mounted at their lower ends between the ends of the first mentioned members and having covering extensions on the ends adjacent the pivots, the said arcuate members being in slightly spaced relation and having a pin extending transversely therebetween, the said pin being arranged to engage in any one of the notches in the angular bar and a coil spring secured to the upper ends of the arcuate members to maintain the said pin in the said notch.

2. In a combined plow and planter, a pair of rearwardly extending spaced members secured to the plow beam, an angular bar pivoted between the said members having a sub-soil plow on the lower end thereof and an upwardly extending arm, a pair of spaced arcuate members pivoted at their lower ends to the first mentioned member, extensions on the said arcuate members, the said extensions forming coverers, the said arcuate members and the said arm being so connected that they may be adjusted with relation to each other to simultaneously adjust the sub-soil plow and the said extensions and resilient means for maintaining the said plow and extensions in their adjusted positions.

In testimony whereof, I affix my signature, in the presence of two witnesses.

GUSTAVUS A. BAKER.

Witnesses:
J. A. BATSON,
T. B. NORWOOD.